United States Patent [19]

Casebolt et al.

[11] Patent Number: 5,515,083
[45] Date of Patent: May 7, 1996

[54] TOUCH SCREEN HAVING REDUCED SENSITIVITY TO SPURIOUS SELECTIONS

[75] Inventors: Mark Casebolt, Seattle; James M. Dahl, Woodinville, both of Wash.

[73] Assignee: Spacelabs Medical, Inc., Redmond, Wash.

[21] Appl. No.: 198,046

[22] Filed: Feb. 17, 1994

[51] Int. Cl.[6] .................................................. G09G 5/00
[52] U.S. Cl. ............................................ 345/175; 345/173
[58] Field of Search .................................... 345/172, 175, 345/178, 179, 180, 181, 182; 178/18, 19

[56] References Cited

U.S. PATENT DOCUMENTS

| | | | |
|---|---|---|---|
| 4,774,404 | 9/1988 | Hasegawa et al. | 345/175 |
| 4,812,830 | 3/1989 | Doering | 345/175 |
| 4,898,555 | 2/1990 | Sampson | 178/18 |
| 4,904,857 | 2/1990 | Ando et al. | 345/175 |
| 4,959,810 | 9/1990 | Darbee et al. | 455/151.1 |

*Primary Examiner*—Tommy P. Chin
*Assistant Examiner*—Gin Goon
*Attorney, Agent, or Firm*—Seed and Berry

[57] ABSTRACT

A touch screen assembly including a molded cover and base is described. A mounting board is sandwiched between the cover and the base and supports a plurality of LEDs and detectors. Cylindrical guides corresponding to each of the LEDs and detectors are formed in the base when the base and cover are attached. The guides at the LEDs limit beam spreading and guides at the detectors prevent off-axis light from being detected. Support pedestals formed in the base, together with the cylindrical guides help align and support the LEDs and detectors to prevent misalignment and problems associated with fatigue. The cover is attached to the base by catch hooks which may be reached without disassembly of the CRT. Access to the mounting board is thereby facilitated.

13 Claims, 4 Drawing Sheets

TOUCH SCREEN HAVING REDUCED SENSITIVITY TO SPURIOUS SELECTIONS

TECHNICAL FIELD

The present invention relates to touch screens and, more particularly, to touch screens having reduced sensitivity to spurious selections.

BACKGROUND OF THE INVENTION

Touch screens are typically mounted to cathode ray tube (CRT) displays. They usually include a plurality of LEDs arranged along two orthogonal edges of the CRT display to emit infrared light across the face of the CRT display. A plurality of detectors corresponding to the plurality of LEDs are positioned along the remaining two edges of the CRT display.

To make a selection from the screen, a user contacts a region of the CRT display, thereby breaking at least one of the light beams in each orthogonal direction. The corresponding detectors along the edges detect the broken beams. Each detector corresponds to an x or y-axis coordinate. Thus, by identifying the detectors corresponding to the location selected by the user, the device identifies the x and y coordinates of the region of the CRT display selected by the user.

Such touch screen assemblies typically require each LED in the rows of LEDs to be individually aligned such that the beam of light from each is emitted toward the appropriate detector. The LED is often oriented by hand, such that the central portion of the beam is directed precisely toward the corresponding detector. Touch screen assemblies can therefore be difficult, time consuming and expensive to fabricate.

Such designs are based upon the use of leaded through hole low cost parts; i.e., "T1" LEDs and detectors. The designs take advantage of the flexibility of leaded through hole parts by using the lead spring to orient the devices. Other devices are available, such as RIGHT ANGLE parts which are more expensive. Use of "STANDARD" T1 parts is preferred for cost reasons. Similarly, "T1" style phototransistors are used, because one object of the design is to minimize production costs.

Other approaches to touch screen designs include the use of LEDs that are surface mounted with elaborate lens structures. After the LEDs and detectors are so oriented, their orientation is maintained by their semirigid leads. Over time, the LEDs and detectors may drift from their precise orientation due to vibration, fatigue of the leads, and/or other effects such as temperature. Such failures may require that the assembly be repaired or replaced, increasing costs of operation.

Further, even where the device does not fail due to misorientation of the LEDs and/or detectors, the operation of the touch screen assembly may be impaired by such misalignment. For example, where the central portion of a beam of light from one LED is slightly misdirected, a large portion of the energy from that LED does not reach its corresponding detector. Thus, because the light energy available to the detector is reduced, the sensitivity of the assembly may be impaired. Moreover, some of the misdirected light may impinge upon a detector corresponding to a different LED. The light energy impinging upon such a detector will reduce the sensitivity of the detectory by making it more difficult to detect when the light beam corresponding to that detector is broken.

The cost of repair and maintenance of touch screen assemblies is made more expensive and difficult by their being mounted as part of a CRT assembly. Repair or replacement usually requires the. CRT to be partially disassembled to provide access to the optical elements.

SUMMARY OF THE INVENTION

According to principles of the present invention, a touch screen assembly includes a substantially rectangular base and a substantially rectangular cover having mounting platforms therebetween. Sidewalls of the base and cover define a display opening for viewing a CRT display.

A plurality of LEDs are mounted to two of the platforms along orthogonal edges of the display opening. Corresponding detectors are mounted on the other two platforms along the remaining two edges of the display opening.

In one embodiment, guide portions are formed in sidewalls of each of the Base and the cover such that when the base and cover are interconnected, the guide portions together form cylindrical guides extending from the distal ends of the LEDs toward the display opening. The cylindrical guides at the LEDs prevent divergence of light beams from the LEDs by helping to collimate the light. The cylindrical guides at the detectors block off-axis light to prevent loss of sensitivity of the touch screen assembly.

The base also includes integral support pedestals having a first end connected to the base and provide a platform at the second end to support the LEDs and detectors to prevent fatigue and misalignment. The second end advantageously includes a curved surface adapted to conform to the bodies of the LEDs and detectors.

The cover advantageously connects to the base using pivot hooks which allow the cover to be detached to provide access to the LEDs and detectors without removing the touch screen assembly from the CRT display.

The guide portions and pedestals provide support to the LEDs and detectors land help to align the LEDs and detectors in their desired orientations. Because the guides and support pedestals are integral to the base and cover and engage the LEDs and detectors as the cover is attached to the base, the LEDs and detectors are aligned with their desired orientation simultaneously with the attachment of the cover to the base, thus reducing the need for each of the LEDs and detectors to be aligned by hand.

DETAILED DESCRIPTION OF THE INVENTION

Figure 1:
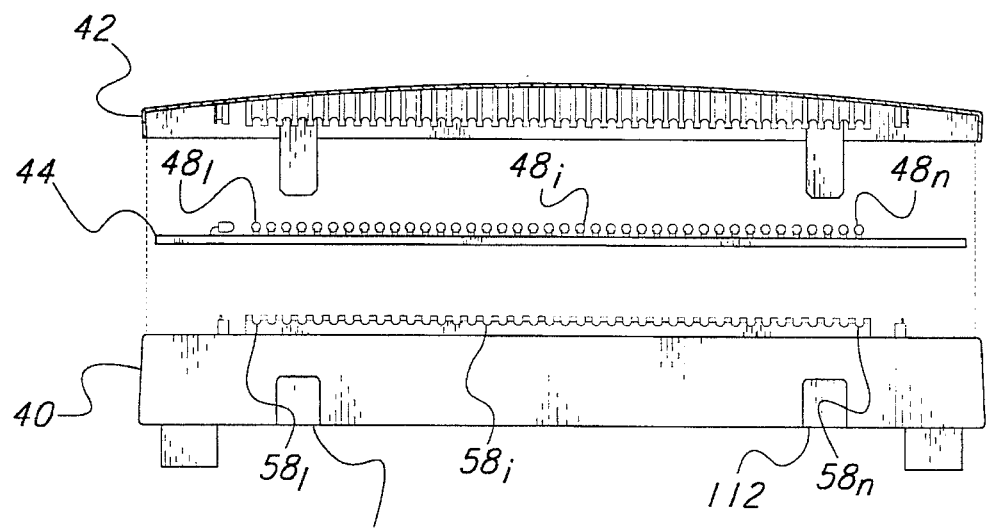
FIG. 1 is an exploded orthogonal view of the preferred embodiment of the inventive device.

As shown in FIG. 1, the preferred embodiment of the inventive device includes a base 40, a cover 42 and a mounting board 44, with the base and cover connected and the mounting board sandwiched therebetween. As can best be seen in FIG. 3A, the base includes four longitudinal side pieces. The four side pieces are interconnected in a generally rectangular configuration with sidewalls of the pieces defining a display opening 46 conforming substantially in shape to a typical CRT display screen.

Figure 2:
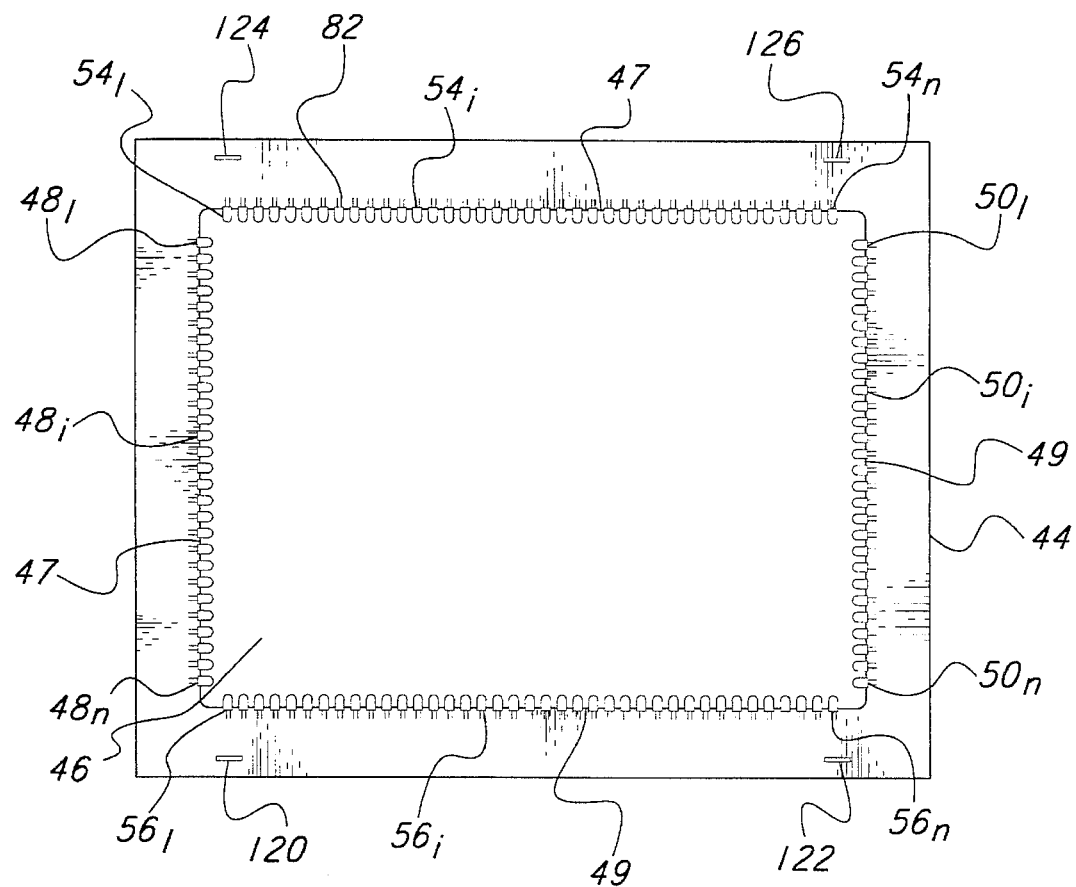
FIG. 2 is a bottom plan view of the mounting board.

As seen in FIG. 2, the mounting board 44 includes four orthogonal planar platforms interconnected in a substantially rectangular configuration so that a CRT display will be visible. A plurality of LEDs 48, 54 are mounted along edges 47 of two of the platforms adjacent the display opening 46. The LEDs 48, 56 emit light transversely across the display opening 46 toward a plurality of optical detectors 50 and 54 mounted along opposite edges 49 of the remaining two platforms adjacent the display opening 46. Each of the detectors is oriented to receive light emitted from its corresponding LED.

Figure 3A:
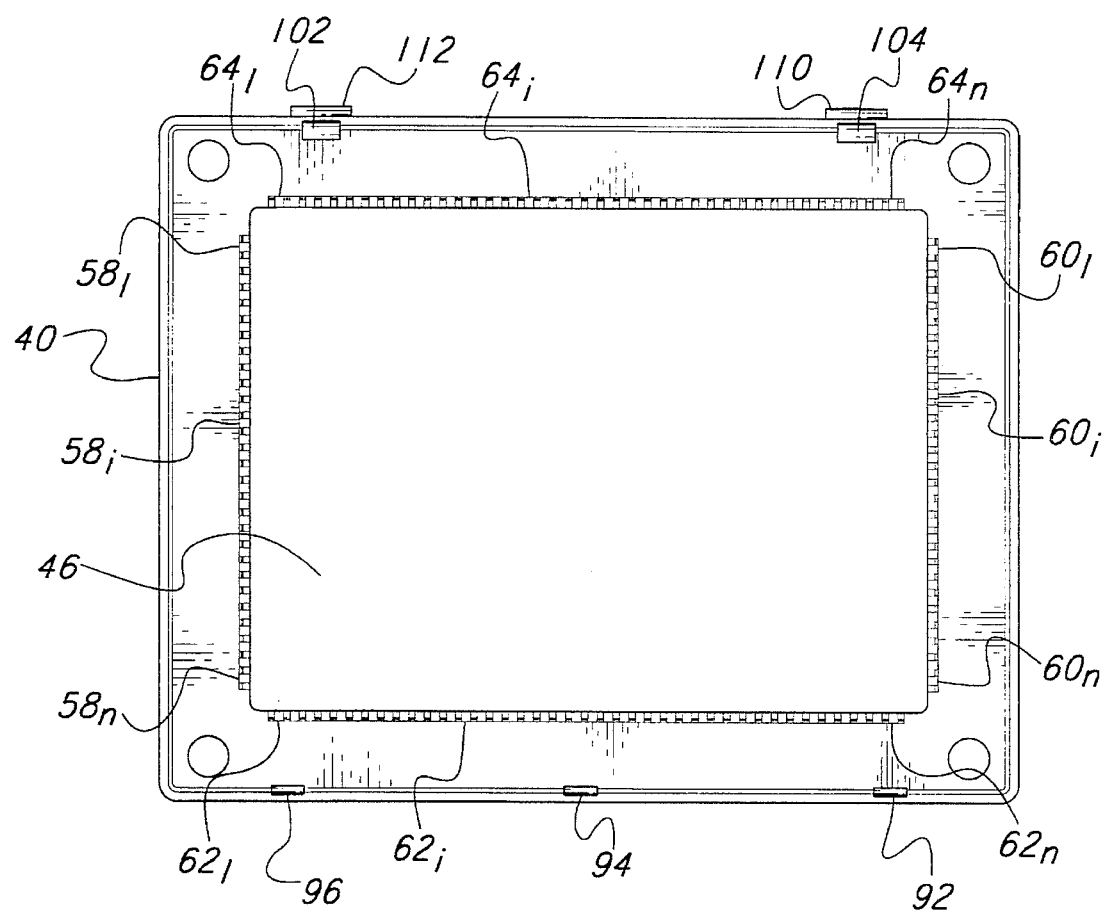
FIG. 3A is a top plan view of the base of the preferred embodiment.
Figure 3B:
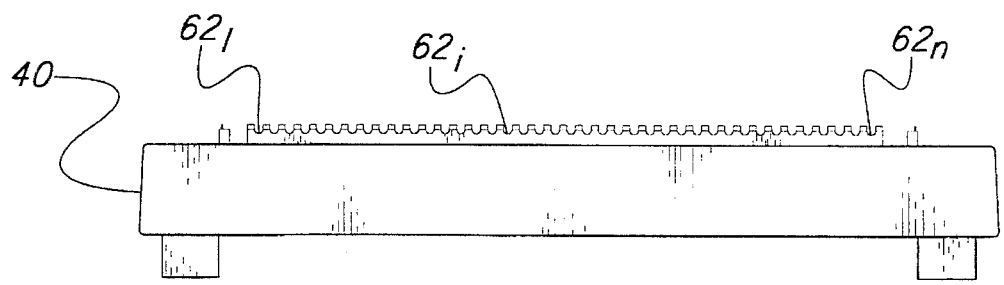
FIG. 3B is a side elevational view of the base of the preferred embodiment.

As can be seen from FIGS. 1, 3A and 3B, the base 40 includes a guide half 58 for each of the LEDs 48, a guide half 60 for each of the optical detectors 50, a guide half 62 for each of the LEDs 56 and a guide half 64 for each of the detectors 54. Each of the guide halves 58, 60, 62 and 64 is a half cylinder integrally formed along one of the sidewalls defining the display opening. The linear dimensions of the guide halves extend orthogonally to the sidewalls and away from the display aperture. Thus, when the mounting board is attached to the base 40 the guide halves extend toward the edges 47, 49 of the mounting board with a section of the cylindrical portion partially encircling a distal portion of their respective LEDs, as discussed below.

Figure 4A:
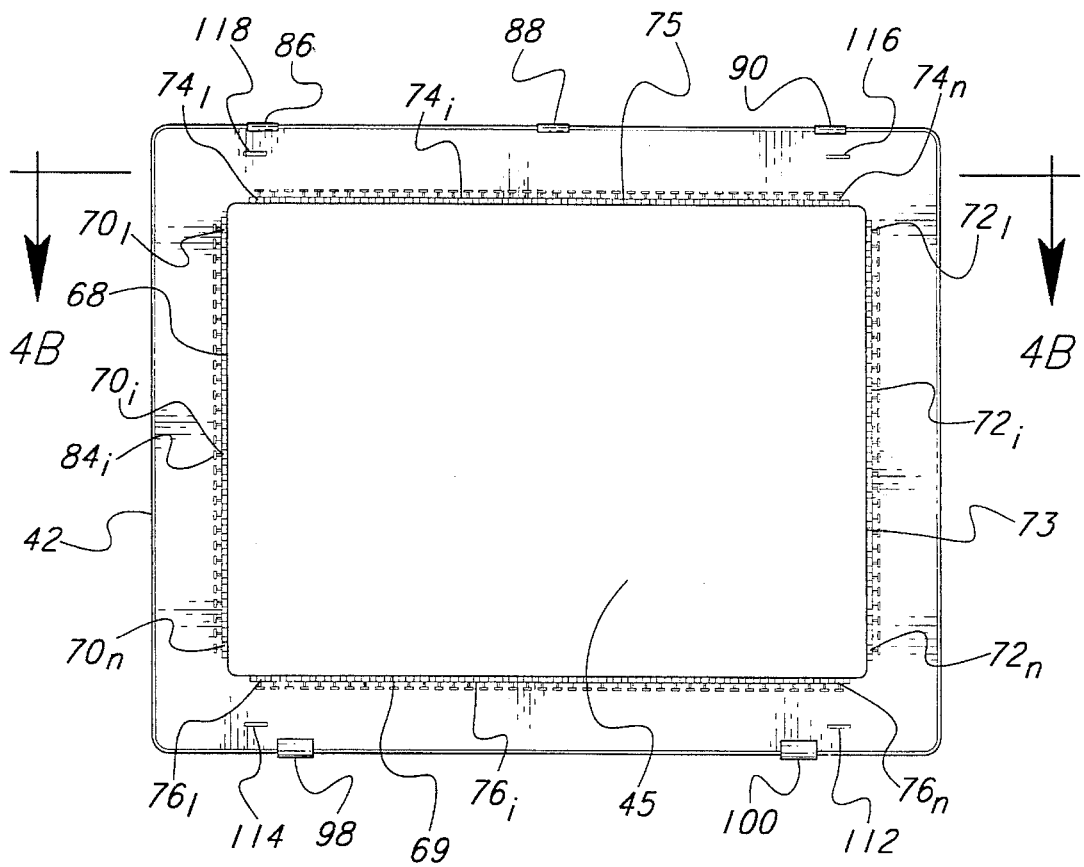
FIG. 4A is a bottom plan view of the cover of the preferred embodiment.
Figure 4B:
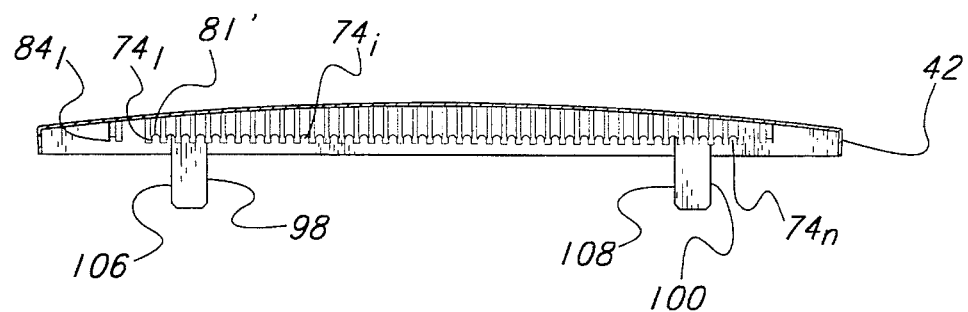
FIG. 4B is a side cross sectional view of the cover of the preferred embodiment.

The cover 42, shown in FIGS. 4A and 4B, is substantially rectangular, with four sidewalls 68, 69, 73, 75 defining a generally rectangular display opening 45 to conform to the outline of typical CRT displays. Guide halves 70, 72, 74, 76 corresponding to the guide halves 58, 60, 62, 64 in the base 40 are formed along each of the sidewalls 68, 69, 73, 75 of the display opening. Each of the guide halves is a half cylinder, substantially a mirror image of the guide halves in the base and integrally formed along one of the sidewalls defining the cover display opening 45.

As can be seen from FIGS. 1, 3A, and 3B and FIGS. 4A and 4B, each of the guide halves in the base 40 corresponds to and is aligned with a corresponding guide half in the cover 42. To distinguish the guide halves in the base from the guide halves-in the cover, guide halves in the base will be referred to herein as the base guide halves and guide halves in the cover will be referred to as cover guide halves.

Figure 5:
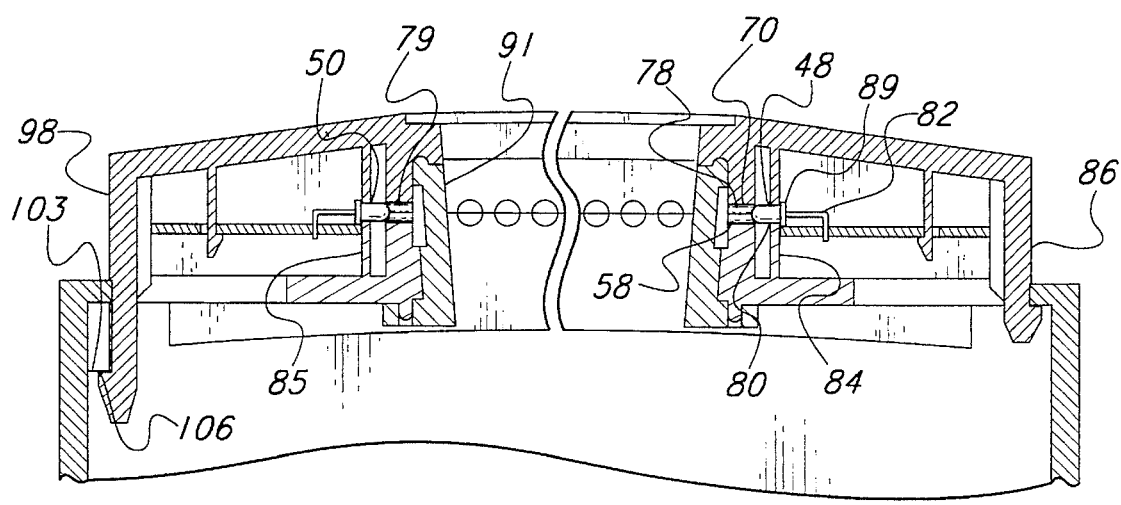
FIG. 5 is a cross sectional detail of a portion of the preferred embodiment.

FIG. 5 shows a detailed cross section of a section of the touch screen assembly surrounding one of the LEDs 48 and one of the detectors 50. It will be understood that the following description applies equally to those portions of the inventive assembly surrounding other LEDs 56 or optical detectors 54 and their corresponding guide halves 64, 62, 74, 76.

When the cover 42 is attached to the base 40 with the mounting board 44 sandwiched therebetween, each of the cover guide halves 70 mates to a corresponding base guide half 58 to form a cylindrical guide 78 which is axially aligned with a body 80 of the corresponding LED 48.

The circumference of the cylindrical guide 78 is preferably approximately equivalent to, but slightly larger than, the circumference of the corresponding body 80 of the LED 48. The body 80 preferably extends slightly at its output end into the cylindrical guide 78 when the device is assembled. In this position, the cylindrical guide 78 surrounds a portion of the LED body 80 to hold it in alignment and light emitted from the LED 48 is directed through the cylindrical guide 78. Light exiting the cylindrical guide is thus directed transversely across the display opening 46 toward the detector 50 with its corresponding cylindrical guide 79.

Prior to assembly of the complete touch screen assembly of FIG. 5, the LED 48 is held in rough alignment by its semi-rigid leads 82, The cylindrical guide 78 improves alignment and provides support by forcing the LED body 80 to be aligned normally to the base aperture. Additional precision of alignment is aided by a support pedestal 84 which engages the LED body 80 near its base 89. The support pedestal 84 is preferably formed integrally to the base 40 and includes an upper surface 81 curved to mate with the LED body 80. A corresponding support pedestal 85 engages the detector to aid in its alignment.

In addition to helping align the LED 48 and the detector 50, the cylindrical guides 78, 79 and the support pedestals 84, 85 provide additional support to prevent problems associated with vibrations and general fatigue of the semi-rigid lead 82, such as a drifting out of alignment. A shield 91 having four sidewalls of an infrared transmissive material and conforming to the sidewalls mates to the touch screen assembly. The shield protects the cylindrical guides, sources and detectors, while permitting light to travel from the sources to the detectors substantially unobstructed.

Advantageously, the cover 42 detachably connects to the base 40 in a fashion that simultaneously engages the support pedestals 84, 85 to the LEDs and detectors and forms the cylindrical guides 78, 79 around the corresponding LEDs and detectors. Thus, as the touch screen assembly is connected, the LEDs and detectors are supported and aligned.

In the preferred embodiment, detachable connection is achieved with a trio of edge hooks 86, 88 and 90 integral to the cover 42 which engage a trio of corresponding hook slots 92, 94 and 96 in the base 40 as best seen in FIGS. 4A and 5. A pair of retaining catches 98, 100 on an opposite side of the cover 42 extend to penetrate a pair of slots 104, 102 in the base 40.

The cover 42 is attached to the base 40 by inserting the pivot hooks 86, 88, 90 into the hook slots 92, 94, 96 with the cover initially tilted at an angle to the base 40. The cover is then pivoted such that the retaining catches 98, 100 move toward and enter the retaining slots 102, 104 in the cover. When the retaining catches 98, 100 are fully inserted into the retaining slots 102, 104, lips 106, 108 (108 not shown) engage a shoulder 103 integral to the base and prevent the cover 42 from pivoting relative to the base 40. The pivot hooks 86, 88, 90 thus remain held by the hook slots 92, 94, 96 and the cover is fixedly connected to the base 40.

To provide access for a user to release the retaining catches 98, 100 from the slots 102, 104, a pair of access apertures 110, 112 are formed in a sidewall of the base 40. The apertures are preferably of sufficient size to allow a user to reach the retaining catches and press them inwardly toward the base aperture 66 thereby releasing the lips 106, 108 from engagement with the lower surface of the base. With the lips no longer engaged, the cover may be rotated upwardly releasing the pivot hooks so that the cover can be removed.

When the cover 42 is pivoted toward alignment with the base as described above, the upper surfaces of the support pedestals 84, 85 engage the LED and detector bodies 80 and the base guide halves 58, 60, 62, 64 and cover guide halves 70, 72, 74, 76 are brought together around the ends of the LEDs and detectors. The semi-rigid leads 82 of the LEDs and detectors flex where necessary to permit the support pedestals and cylindrical guides to redirect the LEDs and detectors and align them more precisely.

The mounting board is mounted to the cover 42 using four similar board catches 112, 114, 116, 118 which engage four corresponding slots 120, 122, 124, 126 in the mounting board 44, as shown in greater detail in FIG. 5. For one of the catches 114, a lip 128 engages the mounting board to hold it in place. To release the lip 128 from engagement with the mounting board, the board catch 114 may be bent outwardly, away from the LED by applying pressure through the access apertures 110, 112. Because the corresponding slot 120 is sufficiently large to permit the entire end portion of the retaining catch 114 to exit, the mounting board 40 may then be removed by sliding it away from the cover.

It will be noted that the mounting board 44 may thus be accessed and removed without removing the base from the CRT and without requiring any special tools advantageously reducing the cost and complexity of performing repairs to the mounting board 44.

In addition to providing mechanical support and alignment aid for the LEDs and detectors, the cylindrical guide 78 also aids in columnization of the beams from the LEDs and in blocking off-axis light from the detectors. This effect will be explained with respect to FIG. 6. It will be understood that FIG. 6, is not drawn to scale in order to present more clearly the operation of the device.

Figure 6:
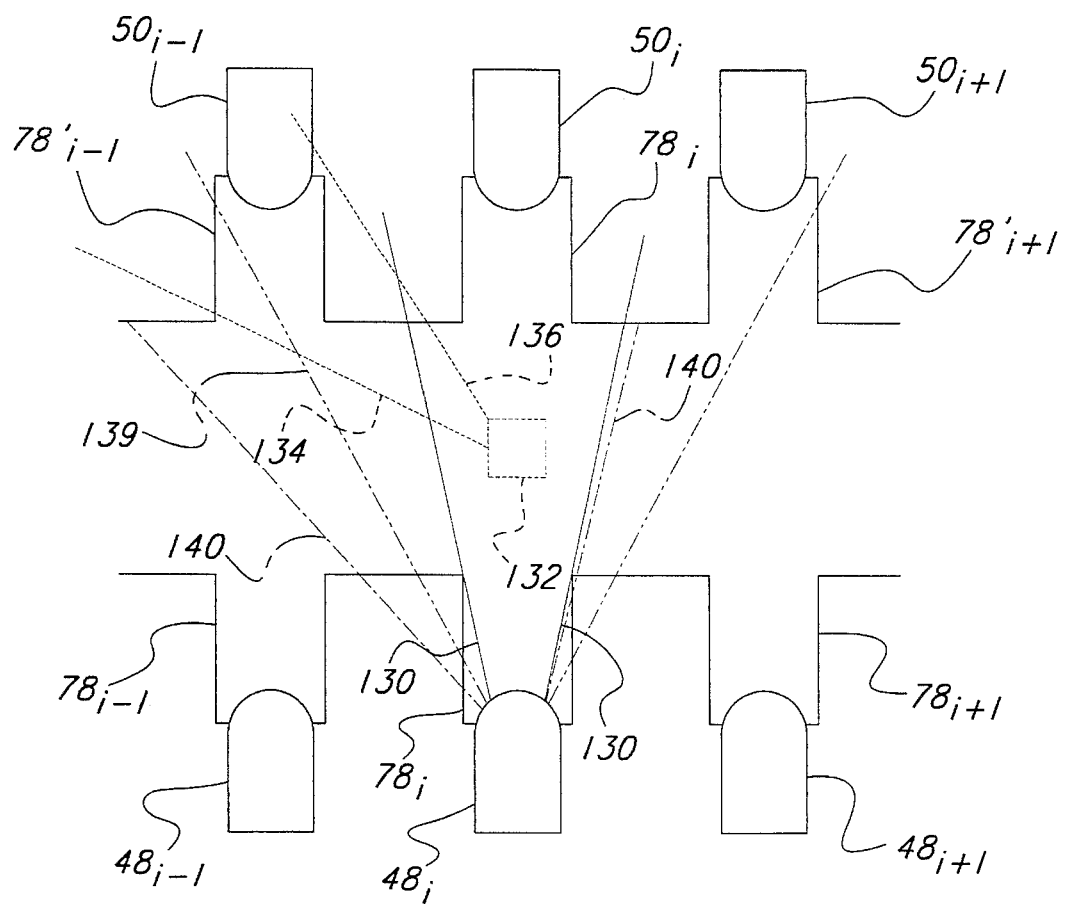
FIG. 6 is a representational drawing of the optical effect of a cylindrical guides.

With reference to FIG. 6, when the LED $48_i$ is energized, it emits a beam of light 130 toward a corresponding detector $50_i$. In the absence of the cylindrical optical guide $78_i$, the optical beam 130 would spread as shown by the dashed lines in FIG. 6. It will be understood by one skilled in the art that the spread of the beam from the LED 48 may be defined in a number of fashions (e.g., the angle could be defined as the $-3$ dB point of the light intensity). This prevents contamination of adjacent touch screens as well.

If the beam spread is sufficient, light from the LED $48_i$ may be directed toward adjacent detectors $58_{i-1}$, $50_{i+1}$ as shown by arrows 139. As is known in the art, misdirected light and light from beam spreading is known to cause errors and loss of sensitivity.

With the cylindrical guide $78_i$ in front of the LED, off-axis light is blocked, thereby reducing the effective spread of the beam as shown in the solid lines of FIG. 6. Thus, the cylindrical guide $78_i$ reduces the effective spreading of a beam from the LED. Columnization of light by the cylindrical guides will also prevent contamination of adjacent touch screens as well by blocking light from spreading out of the plane of the touch screen. This prevents lights from one of the LEDs 48 from exiting the touch screen assembly and being detected by a detector in a different touch screen assembly.

In a similar fashion, the cylindrical guide advantageously reduces problems caused when the beam from the LED is skewed, such as might occur if the die of the LED was offset with respect to the body. As shown in the broken dashed line of FIG. 6, skewed light as shown by the broken line 140 may cause substantial light energy to be directed to an improper detector, even if the LED body is aligned properly. However, in the inventive device, the skewed light is blocked by the cylindrical guide 78 and the beam is effectively directed toward the corresponding detector 50.

The cylindrical guides 78 in front of the detectors 50 also reduce effects of off-axis light caused by user selection. As shown in the block 132, when an operator makes a selection on the touch screen, the beam 130 from the LED 48 to the detector 58 is broken. In some instances, however, the beam may only be redirected off-axis as outlined by the rays 134, 136. In the absence of the cylindrical guide $78'_{i-1}$, this off-axis light would strike the adjacent detector $58_{i-1}$ and perhaps cause an error. As shown, the cylindrical guide $78'_{i-1}$ blocks the off-axis light and prevents it from striking the detector $58_{i-1}$.

It will be understood by one skilled in the art that although the use of cylindrical guides at both the LEDs and the detectors is preferred, guides in front of only the detectors or LEDs is within the scope of the invention. Further, although the guides are described as being cylindrical guides, it will be appreciated that other shapes are within the scope of the invention.

The invention is therefore described by the claims appended hereto and is not restricted to the embodiments shown herein.

We claim:

1. A touch screen assembly having reduced sensitivity to spurious selections comprising:

a base having four sidewalls interconnected in a substantially rectangular configuration, said base having a size and shape selected to allow said sidewalls to be positioned along respective edges of said screen with a display opening positioned between said sidewalls defining a first opening display;

a cover having four sidewalls interconnected in a substantially rectangular configuration defining a second display opening conforming substantially in shape to said first display opening, said cover having a size and shape selected to allow said cover to mate with and at least partially overlay said base, said cover being connectable to said base to overlay said base with said first display opening axially aligned with said second display opening;

a plurality of mounting platforms positioned substantially adjacent to said sidewalls, said mounting platforms being positionable between said base and said cover;

a plurality of optical detectors mounted on a first of said mounting platforms along a portion of an edge of said first mounting platform, said portion of said first edge being adjacent to and conforming to a first of said sidewalls of said base said detectors being oriented to detect light exiting laterally from said display opening;

a plurality of optical sources mounted on a second of said mounting platforms along an edge of said second mounting platform adjacent said display opening, said edge of said second mounting platform being adjacent to and conforming to a second of said sidewalls of said base opposite said first sidewall, each said optical source having a predetermined beam pattern, and each optical source further being aligned such that a central portion of its beam pattern is directed transversely across said display opening toward a corresponding one of said detectors along said edge of said first platform;

a plurality of base guide halves integral to said first sidewall of said base and having an inner surface defining a first portion of a substantially cylindrical guide each of said first portions of said cylinder extending between a distal end of said optical detectors and said display opening, each of said base guide halves being substantially axially aligned with a corresponding one of said central portions of said beam patterns of said optical sources; and a plurality of cover guide halves extending integral to said sidewalls of said cover corresponding to said first sidewall of said base, each said cover guide halves defining a second portion of a cylindrical guide wherein said first portion of said cylindrical guide and said second portion of said cylindrical guide together being aligned with a corresponding one of said inner guide halves to form a cylindrical optical guide communicating between said display opening and said corresponding one of said optical detectors.

2. The touch screen of claim 1 further including a plurality of detector supports integral to said base, each such detector support including a rigid member connected at a first end to said base and extending therefrom substantially parallel to said first sidewall, each detector support further having a surface generally conforming to an outer surface of said optical detectors for engaging said outer surface to provide mechanical support for said optical detectors.

3. The touch screen assembly of claim 2 wherein said base further includes a plurality of slots through an upper surface of said base and said cover includes a retaining catch in said cover for attaching said cover to said base by engaging said slot.

4. A touch screen assembly having reduced sensitivity to spurious elections comprising:

a base having four sidewalls interconnected in a substantially rectangular configuration, said base having a size and shape selected to allow said sidewalls to be positioned along respective edges of said screen with a display opening positioned between said sidewalls defining a first display opening;

a cover having four sidewalls interconnected in a substantially rectangular configuration defining a second display opening conforming substantially in shape to said first display opening, said cover having a size and shape selected to allow said cover to mate with and at least partially overlay said base, said cover being connectable to said base to overlay said base with said first display opening axially aligned with said second display opening;

a plurality of mounting platforms positioned substantially adjacent to said sidewalls, said mounting platforms being positionable between said base and said cover;

a plurality of optical detectors mounted on a first of said mounting platforms along a portion or an edge of said first mounting platform, said portion of said first edge being adjacent to and conforming to a first of said sidewalls of said base, said detectors being oriented to detect light exiting laterally from said first display opening;

a plurality of optical sources mounted on a second of said mounting platforms along an edge of said second mounting platform adjacent said display opening, said edge of said second mounting platform being adjacent to and conforming to a second of said sidewalls of said base opposite said first sidewall, each said optical source having a predetermined beam pattern, and each optical source further being aligned such that a central portion of its beam pattern is directed transversely across said display opening toward a corresponding one of said detectors along said edge of said first platform;

a plurality of base guide halves integral to said first sidewall of said base and having an inner surface defining a first portion of a substantially cylindrical guide each of said first portions of said cylinder extending between a distal end of said optical sources and said first display opening, each of said base guide halves being substantially axially aligned with a corresponding one of said central portions of said beam patterns of said optical sources when said base aperture is axially aligned with said board aperture; and a plurality of cover guide halves extending between a distal end of said optical source and said second display opening and integral to said sidewall of said cover corresponding to said first sidewall of said base, each said cover guide halves defining a second portion of a cylindrical guide wherein said first portion of said cylindrical guide and said second portion of said cylindrical guide together being aligned to form a cylindrical optical guide communicating between said display opening and said corresponding one of said optical sources.

5. The touch screen of claim 4 further including a plurality of source supports integral to said base, each such source support corresponding to one of said optical sources including a rigid member connected at a first end to said base and extending therefrom substantially parallel to said first sidewall, each source support further having an upper surface generally conforming to an outer surface of its corresponding optical source for engaging said outer surface to provide mechanical support for said optical source.

6. The touch screen of claim 5 further including:

a second plurality of base guide halves integral to said second sidewall of said base;

a second plurality of base guide halves integral to said second sidewall of said base each having an inner surface defining a portion of a substantially cylindrical guide each of said portions of said cylinder extending between a distal end of said optical source and said display opening, each of said base guide halves being substantially axially aligned with a corresponding one of said central portions of said beam patterns of said optical sources when said base aperture is axially aligned with said board aperture; and a second plurality of cover guide halves extending between a distal end of said optical source and said second display opening and integral to said sidewall of said cover corresponding to said second sidewall of said base, each said cover guide half defining a second portion of a cylindrical guide wherein said first portion of said cylindrical guide together being aligned to form a cylindrical optical guide communicating between said display opening and said corresponding one of said optical sources.

7. The touch screen assembly of claim 4 wherein said base further includes a plurality of slots through an upper surface of said base and said cover includes a retaining catch in said cover for attaching said cover to said base by engaging said slot.

8. The touch screen assembly of claim 7 wherein said retaining catch includes a tensioning member and a lip at a distal end of said tensioning member and said base further includes a shoulder positioned for engagement by the lip and an access aperture in said base, said access aperture providing access for a user to release said lip from engagement with said edge portion of said slot and thereby release said cover from fixed attachment to said base.

9. A method of reducing spurious selections in a touch screen assembly having a plurality of optical detectors mounted at a first edge of a screen aperture of a mounting board, and a plurality of optical sources mounted along a second edge of the screen aperture opposite said first edge and each of said optical sources being oriented to emit a beam of light transversely across the screen aperture, wherein each of the optical detectors is oriented to receive light from a corresponding optical source comprising the steps of:

forming a plurality of optical guide halves along a first edge of a screen aperture in a base, forming a plurality of complementary optical guide halves along a corresponding first edge of a cover aperture in a cover;

positioning said base to one side of said mounting board with each of said optical guide halves in alignment with a respective one of said optical sources;

positioning said cover to one side of said mounting board with each of said complementary optical guide halves in alignment with a respective one of said optical sources;

moving said cover toward said base such that said optical guide halves and said complementary optical guide halves are aligned to form an optical guide having inner walls defining an optical light guide, the optical guide being axially aligned between its respective optical source and optical detector; and fixedly attaching said cover to said base.

10. The method of claim 9 wherein said step of fixedly attaching said cover to said base comprises engaging a retaining catch in said cover to a slot in said base to retain said cover fixedly in place.

11. The method of claim 9 wherein said step of positioning said cover to one side of said mounting board comprises inserting a plurality of catch hooks connected to said cover into a plurality of corresponding catch slots in said base and said step of moving said cover toward said base comprises rotating said cover around a line defined by said plurality of catch slots.

12. The method of claim 11 wherein said step of fixedly attaching said cover to said base comprises engaging a retaining catch in said cover to a slot in said base to retain said cover fixedly in place.

13. The method of claim 9 further comprising the step of forming plurality of source supports, each such source support being connected to said base cover and wherein said step of moving said cover toward said base comprises engaging a support surface of each of said source supports to a respective optical source to orient said optical source in a desired orientation.

* * * * *

UNITED STATES PATENT AND TRADEMARK OFFICE
CERTIFICATE OF CORRECTION

PATENT NO.    : 5,515,083
DATED         : May 7, 1996
INVENTOR(S)   : Mark Casebolt and James M. Dahl It is certified that error appears in the above identified patent and that said Letters Patent is hereby corrected as shown below:

On title page,
item [73], please delete "Spacelabs" and insert therefor--SpaceLabs--.

In Column 7, claim 4, line 27, please delete "elections" and insert therefor--selections--.

Signed and Sealed this

Twenty-third Day of July, 1996

Attest:

BRUCE LEHMAN

*Attesting Officer*                *Commissioner of Patents and Trademarks*